July 30, 1946.   R. CHILTON   2,404,827
VALVE GEAR
Filed Nov. 12, 1941   3 Sheets-Sheet 2

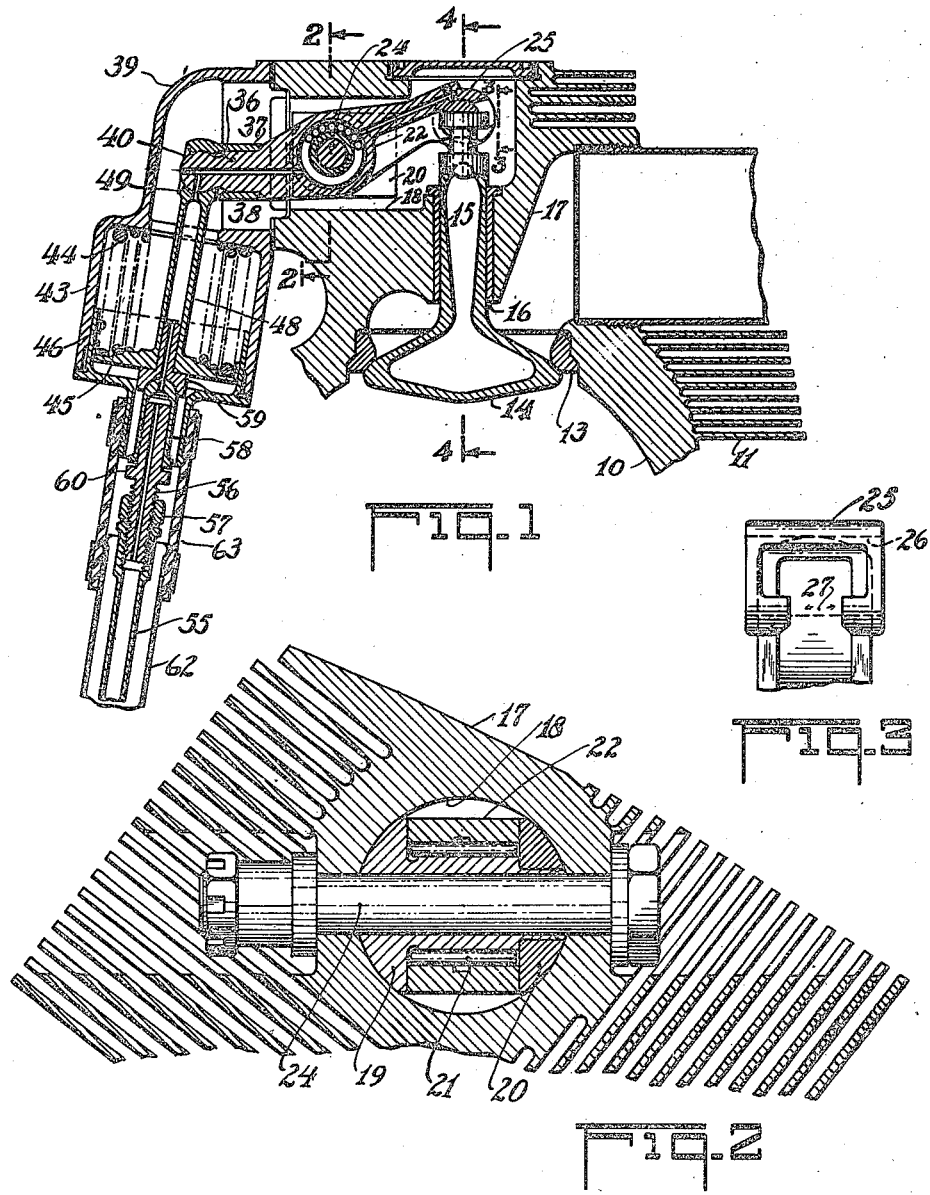

INVENTOR
Roland Chilton.
BY
ATTORNEY

INVENTOR
Roland Chilton.
BY
ATTORNEY

Patented July 30, 1946

2,404,827

UNITED STATES PATENT OFFICE 2,404,827

VALVE GEAR

Roland Chilton, Ridgewood, N. J., assignor to Wright Aeronautical Corporation, a corporation of New York Application November 12, 1941, Serial No. 418,649

14 Claims. (Cl. 123—90)

This invention relates to valve gears and particularly to operating mechanism for valve-in-head cylinders for aircraft engines. A prime object of the invention is to provide valve operating mechanism which occupies less length, axially of the cylinder, than the arrangements conventionally used. A further object is to provide a valve mechanism for radial cylinder engines by which the overall diameter of the engine may be materially reduced. A further object is to provide a mechanism in which a positive push-pull connection is established between a valve stem and an operating mechanism therefor, to eliminate the necessity of locating the usual valve springs around the valve stem. A further object is to provide a valve mechanism in which valve closing springs may be disposed alongside of the engine cylinder, rather than on top of the cylinder, as is conventional with overhead valve engines. Still another object is to provide specific two-way connections between the valve stem and a remote valve operating mechanism, whereby positive closure, as well as positive opening of the valve may be secured.

Further objects of the invention will become apparent in reading the detailed description below in connection with the drawings, in which:

Fig. 1 is a section through part of an engine cylinder and a valve gear according to this invention;

Figs. 2, 3, and 4 are sections on the lines 2—2, 3—3 and 4—4 of Fig. 1;

Figure 4:
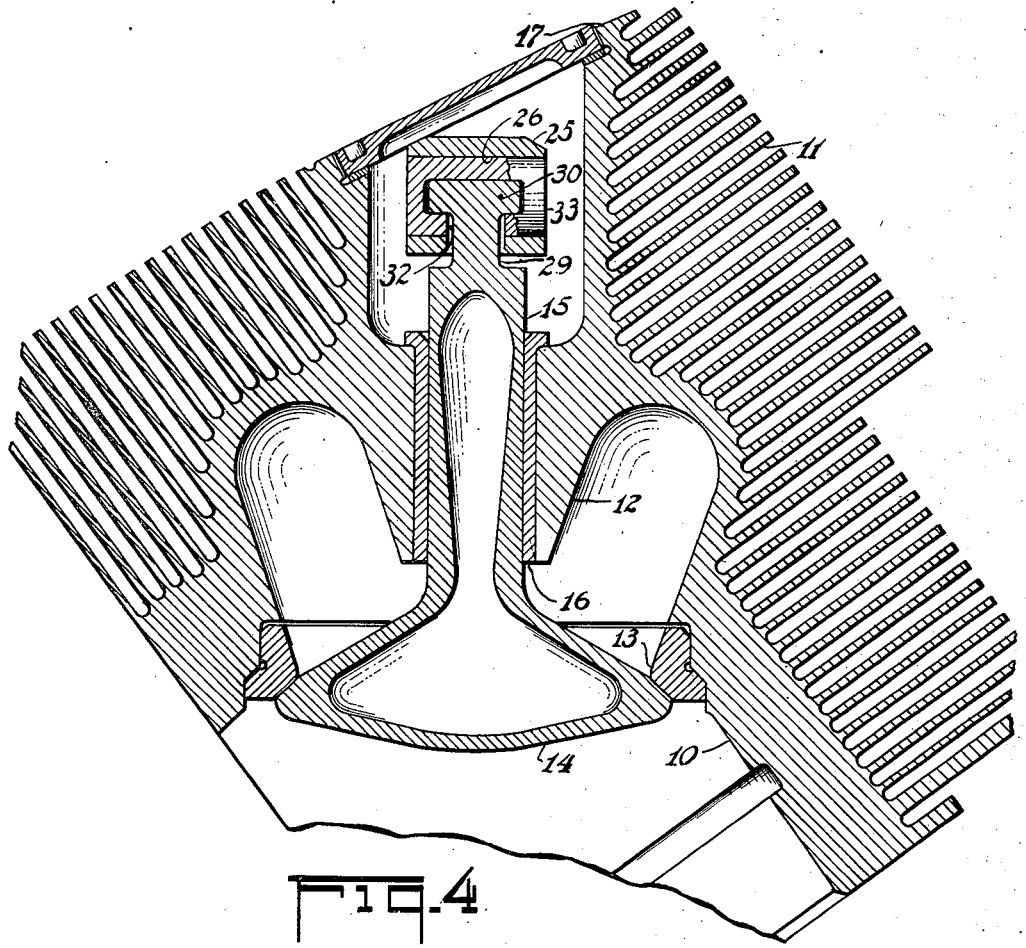

The illustrations are exemplary of an application of the invention to an air-cooled cylinder of a radial cylinder aircraft engine. In the several figures, 10 represents the cylinder head proper, having the usual cooling fins 11 and having an intake or exhaust port 12 having a valve seat 13 upon which a tulip head valve 14 seats, said valve having a stem 15 reciprocable in a valve guide 16 in an extended portion 17 of the cylinder head which forms an integral valve and rocker box housing and also serves to define the contour of the valve port 12. The housing 17 is provided with a bore 18 in which is fitted a rocker arm journal member 19 one end of which is complementary to the cylindrical surface of the bore 18. The other end is provided with a filler washer 20 the exterior of which is also formed in complement to the surface of the bore 18. Between the head of the journal member 19 and the washer 20, an anti-friction bearing 21 is disposed, upon which a rocker arm 22 is mounted. The rocker arm and members 19 and 20 are secured in the bore 18 by a bolt or pin 24 passing through the housing 17.

Figure 9:
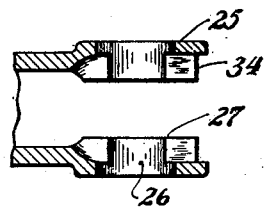
Fig. 9 is a section on the line 9—9 of Fig. 8.

The righthand end of the rocker arm 22, as shown in Figs. 1, 3, 4, 8, and 9, is provided with a boss 25 having a cross bore 26, the lower end of the boss at the cross bore being bifurcated as shown at 27 in Figs. 9 and 3 to allow for passage of the valve stem 15. The latter is grooved just below its top as at 29 to pass through the slot 27 and has a flattened head or button 30 which is slidably fitted to a T-shaped slot 32 in a trunnion 33 journalled in the rocker arm bore 26. The rocker arm boss 25 is relieved as at 34 to allow passage of the valve button 30, and it will be apparent that the valve is free to slide and to creep rotationally on its own axis with respect to the trunnion 33. However, in virtue of the T-slot 32, the valve and trunnion 33 are constrained to joint reciprocation and since the trunnion is journalled within the rocker arm, the valve and rocker arm have a push-pull articulation.

The lefthand end of the rocker arm is provided with a journal portion 36 embraced by a bearing block 37 whose exterior form is substantially square and whose side faces rub against flats 38 machined in a rocker box extension housing 39 secured over the end of the rocker arm to the housing 17. The block 37 assumes side thrust loads imposed by a slanted push-pull valve operating mechanism to be described shortly. The left end of the rocker arm 22 is formed as a ball 40 whose side faces are flattened as shown at 41 in Fig. 7.

Integral with and beneath the housing extension 39 is a valve spring cage 43 within which one or more valve springs 44 are housed, these springs bearing at their top ends against the top of the cage 43. The bottom ends of the springs 44 bear on a washer 45 whose edge is sphericalized to engage a cylinder portion 46 forming a bottom closure for the spring cage 43, said cylinder 46 serving to hold the washer 45 concentric therewith and to allow of angulation of the washer axis with respect to the axis of the cylinder 46. The washer is integral with a link 48 whose upper end is formed as a ball socket 49.

Figure 5:
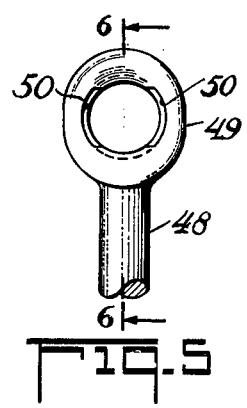
Fig. 5 is an elevation of one end of a push-pull rod.
Figure 6:
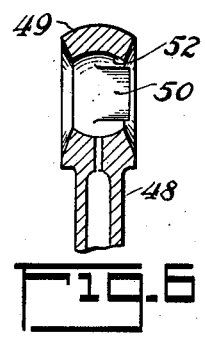
Fig. 6 is a section on the line 6—6 of Fig. 5.

As shown in Figs. 5 and 6, the socket is provided with opposed cylindrical segmental cutouts 50 interrupting part of the spherical ball socket so that it may be assembled upon the ball end 40 of the rocker arm. Such assembly is effected by swinging the link 48 to a substantially horizontal position, referring to Fig. 7, whereupon the spherical portions of the ball end may pass through the cylinder segments 50 of the ball socket, the flats 41 of the ball passing the spherical portions of the socket indicated at 52 in Fig. 6. Thereafter, the link 48 is swung down to its operating position and a secure joint for push-pull operation is afforded between the link and the rocker arm. From the structure thus far described, it will be apparent that the springs 44 place the link 48 under tension, thereby tending to swing the rocker arm 22 counterclockwise and thereby holding the valve head 14 against its seat 13.

Valve opening is effected by a push rod 55 operated by the conventional engine cam, this push rod having a stem 56 screwed into its upper end and secured by a lock nut 57. Over the upper end of the stem 56 is sleeved a thimble 58 whose upper end is formed as a half-ball to engage a socket element 59 piloted in and bearing against the link 48. The stem 56 is formed with an abutment flange 60 which bears against the bottom of the thimble 58, and valve opening force is transmitted from the stem 56 to the thimble 58 at this point. It will be apparent that this operating connection forms a convenient point at which valve clearance may be measured, which measurement may be accomplished by inserting a feeler gage between the abutment 60 and the thimble 58. Clearance adjustment is afforded, as above indicated, by changing the axial relationship of the stem 56 with respect to the push rod 55. Little or no lost motion may take place except in the immediate vicinity of the clearance adjustment connection since the valve springs, located as shown, take up all slack in the rocker arm mechanism.

Figure 7:
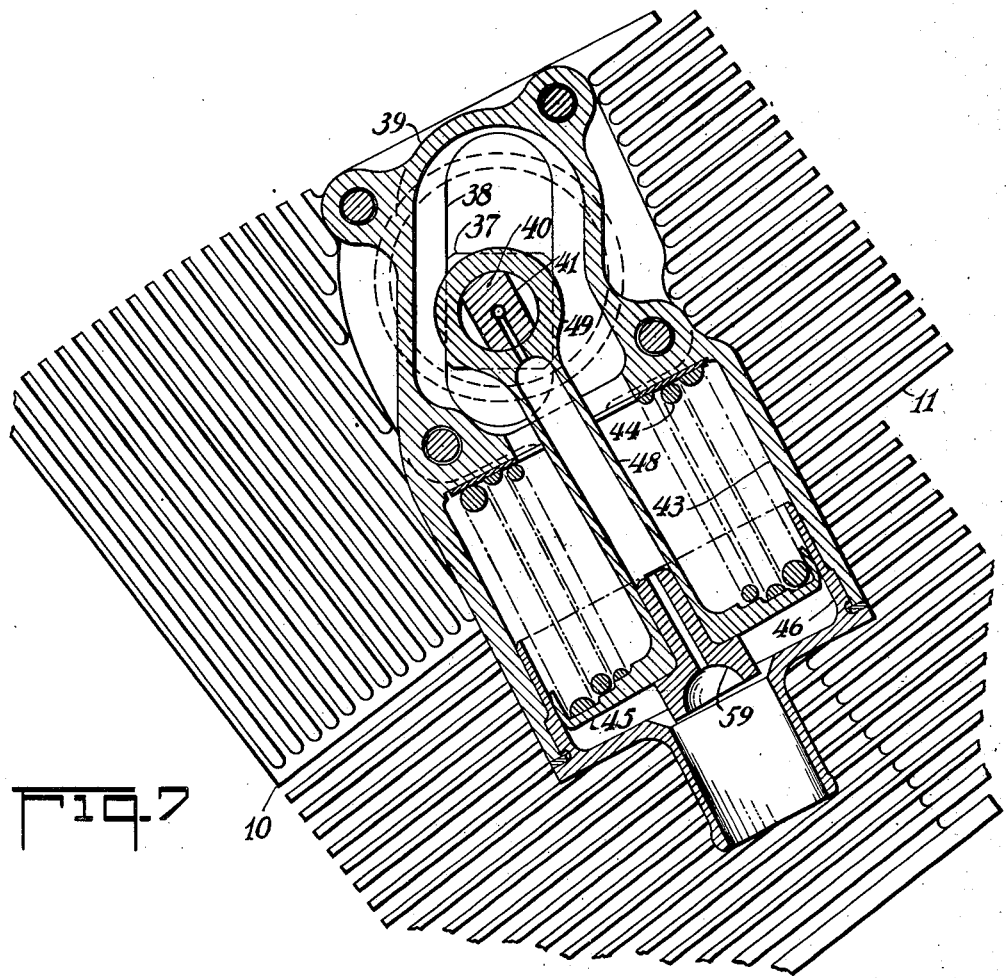
Fig. 7 is an elevation of part of the engine cylinder showing the rocker box and valve springs in section.
Figure 8:
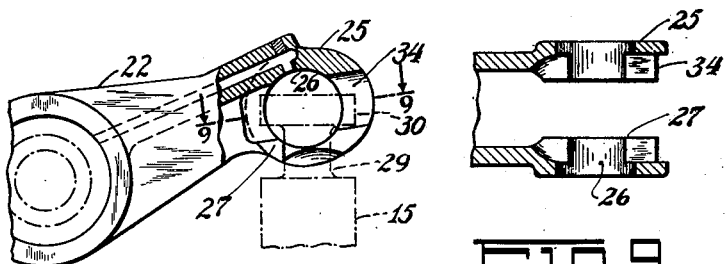
Fig. 8 is an elevation, partly in section, of a rocker arm.

As shown in Fig. 7, the spring housing 43 along with the push rod and associated parts are angled to a considerable extent with respect to the valve axis and it is for this reason that side thrust is exerted upon the rocker arm which side thrust is taken up by the thrust surfaces 37 and 38.

As is conventional in aircraft engine practice, the push rod is protected by a tubular housing 62 and this is joined to the valve cage closure 46 by a hose 63. Sufficient space is left between the top of the push rod housing 62 and the bottom of the closure 46 so that, when the hose 63 is loosened and slid down over the push rod, ample room is allowed for valve clearance adjustment.

Lubrication of this system is quite similar to that utilized in conventional rocker arm arrangements. Oil is fed through the hollow push rod 55, through the stem and thimble, through the link 48, to the lefthand end of the rocker arm 22 whereat the ball and socket joint between the link and rocker arm are lubricated. Thence, lubricant travels through drillings in the rocker arm to the rocker arm bearing and to the trunnion surfaces at the top of the valve. Surplus oil in the rocker box may return to the engine through the spring cage 43 and the push rod housing 62.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a first member, a second member, and a push-pull connection between said members, said connection comprising a recessed neck portion adjacent one end of said first member defining a button at said end, and a cylindrical trunnion slotted to fit said button and clear said neck portion, said trunnion being journaled in said second member.

2. In combination, a slidable member having an annular groove adjacent one end defining an end head portion forming opposed shoulder surfaces, a trunnion member slotted to slidably receive said surfaces, and a lever within which said trunnion is journalled.

3. In combination, a slidable member having an annular groove adjacent one end defining an end head portion forming opposed shoulder surfaces, a trunnion member slotted to slidably receive said surfaces, and a lever, said trunnion being journalled in one end of said lever, said lever end being slotted to pass said head and grooved portion of said member.

4. In combination, a cylinder head, a cylindrical bore within said head defining a rocker arm housing, rocker arm journal means comprising segmental end portions fitted to said bore, a journal integral with one of said end portions and extending transverse to said bore to the other segmental end portion, and a rocker arm on said journal.

5. In combination, a cylinder head, a cylindrical bore within said head defining a rocker arm housing, rocker arm journal means comprising segmental end portions fitted to said bore, a journal integral with one of said end portions and extending transverse to said bore to the other segmental end portion, a rocker arm on said journal, said rocker arm and journal means being slidable endwise into the bore, and a cross pin passing through the walls of said bore and through said journal.

6. In combination, a cylinder head, a bore within said head and spaced from the outer walls of said head thereby providing a one piece wall about said bore, a valve stem slidably mounted within said head and disposed substantially transverse to said bore, a rocker arm pivotally supported by the wall of said bore, said rocker arm having one end engaging said valve stem adjacent the inner end of said bore and having its other end disposed adjacent the open end of said bore, a link articulated to said other rocker arm end, cover means disposed over the open end of said bore and having a cylindrical portion surrounding said link, said link having a head portion slidably and rockably fitted to said surrounding cylindrical portion, and spring means disposed within said cylindrical portion and acting against said link head portion to bias said valve stem in a valve closing direction.

7. In combination, a first member, a second member, and a push-pull connection between said members comprising a pair of opposed co-axial shoulder surfaces on one of said members, and a trunnion member slotted to slidably receive said surfaces, said trunnion member being journaled in the other of said members.

8. In combination, a first member, a second member, and a push-pull connection between said members, said connection comprising a recessed neck portion adjacent one end of said first member defining a head portion at said end, a boss at one end of said second member, and a cylindrical trunnion journaled within a bore in said boss and having a T-shaped slot to fit said head and to clear said neck portion.

9. In combination, a reciprocal member, a lever, and a push-pull connection between said member and lever, said connection comprising a head having spaced parallel surfaces formed adjacent one end of said reciprocal member, and a cylindrical trunnion journaled in said lever and having a slot slidably engaging said parallel surfaces.

10. In combination, a first member, a second member, and a push-pull connection between said members, said connection comprising a head portion formed on said first member, and a cylindrical member having a slot fitted to said head portion, said cylindrical member being journaled in said second member.

11. In combination, a reciprocal member, and a rocker member having a push-pull connection with said reciprocal member, said connection comprising a neck adjacent one end of said reciprocal member and defining a head at said end, a bearing boss at one end of said rocker member, and a cylindrical trunnion journaled within said bearing boss and having a slot to slidably fit said head and to clear said neck, said boss having a slot to pass said neck and head of said reciprocal member.

12. In combination, a cylinder head, a bore within said head and spaced from the walls of said head so as to provide a one piece wall about said bore, a valve stem slidably mounted within said head and disposed substantially transverse to said bore, a rocker arm pivotally supported by the wall of said bore and having a push-pull connection with said valve stem at one end of said rocker arm and adjacent one end of said bore, a valve operating member having a push-pull connection with the other end of said rocker arm adjacent the other end of said bore, a spring acting on and surrounding said member to urge said valve in a closing direction, and cover means over said other bore end providing a housing for said spring.

13. In combination, a cylinder head having a cylindrical bore defining a rocker arm housing, a pair of diametrically opposed cylindrical segments within said bore and having a space therebetween, a shaft-like member extending across said space with its axis transverse to the axis of said bore, and a valve operating rocker member pivotally mounted about said shaft-like member and disposed in the space between said segments.

14. In combination, a reciprocal member, a rocker member having a push-pull connection with said reciprocal member, said connection comprising a head portion formed on an end of said reciprocal member, a trunnion member recessed for rotatably and slidably receiving said head portion, and a bearing portion at an end of said rocker member, said trunnion member being journaled in said bearing portion and said bearing portion having an opening at one side for passage of said head portion into said trunnion member.

ROLAND CHILTON.